United States Patent [19]

Karp

[11] 4,035,808
[45] July 12, 1977

[54] LABEL PRINTER

[75] Inventor: Edward C. Karp, Belvidere, Ill.

[73] Assignee: Sanitary Scale Company, Belvidere, Ill.

[21] Appl. No.: 682,083

[22] Filed: Apr. 30, 1976

[51] Int. Cl.[2] .................. G01D 9/00; G01G 23/38; B32B 31/00

[52] U.S. Cl. .................. 346/9; 346/24; 177/4; 156/384; 156/540; 101/47

[58] Field of Search .......... 177/4; 346/9, 24; 156/384, 540, DIG. 47; 235/58 PS, 58 P, 61 PS

[56] References Cited

U.S. PATENT DOCUMENTS

| | | | |
|---|---|---|---|
| 3,209,998 | 10/1965 | Worst | 235/61 PS |
| 3,346,061 | 10/1967 | Johnston et al. | 235/58 PS X |
| 3,388,404 | 6/1968 | Bush | 346/24 |
| 3,461,984 | 8/1969 | Phillips et al. | 177/4 X |
| 3,660,203 | 5/1972 | Beck et al. | 156/384 |
| 3,701,991 | 10/1972 | Livesey | 346/9 |
| 3,966,534 | 6/1976 | Oddy | 156/384 |
| 3,974,887 | 8/1976 | Allen et al. | 177/4 |

*Primary Examiner*—George H. Miller, Jr.

[57] ABSTRACT

An apparatus for printing and delivering a label-receipt type tape member which displays the results of a variable number of operations of a computing scale including the value of items weighed on the scale, the value of fixed price items not weighed on the scale, and the total value of a group of items including fixed price items and items required to be weighed, the apparatus comprising a supply reel of continuous laminate tape coated on one side and protected with a cover web, a printing including a printing head responsive to the operations of the computing scale to print the information supplied on successive lines of the tape, a stripper bar, a take-up reel for pulling the cover web over the stripper bar under tension and to separate the cover web from the printed tape, and a tear surface adapted to permit the separation of the presented portion of printed tape from the continuous tape as a label-receipt.

7 Claims, 3 Drawing Figures

FIG-1-
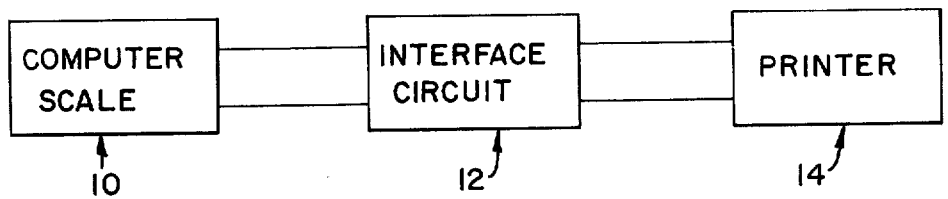
FIG-2-
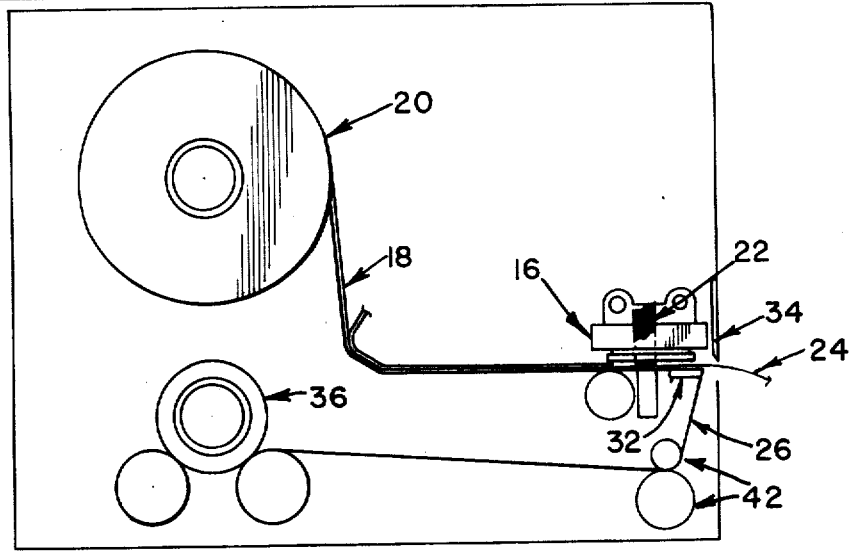
FIG-3-
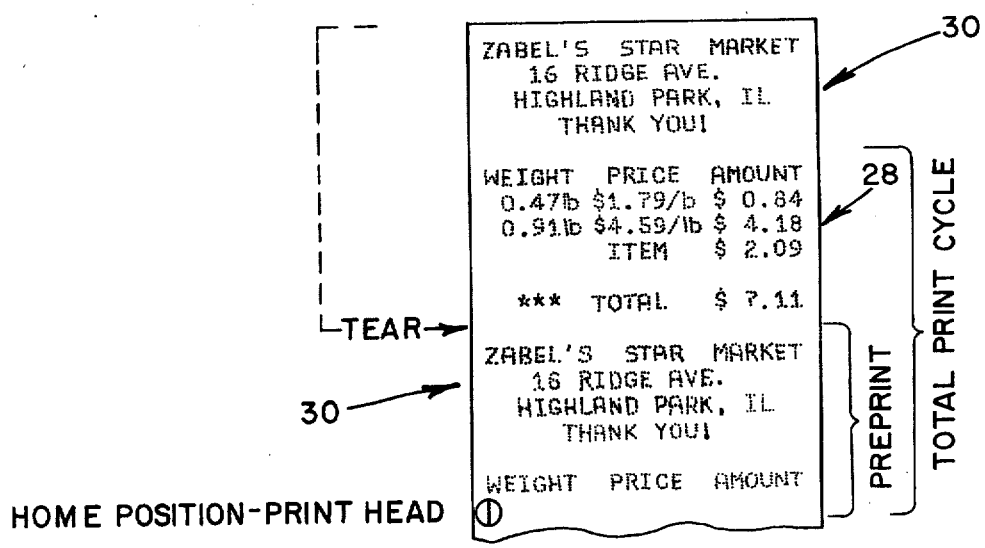

LABEL PRINTER

This invention relates to weighing scale operations and is more particularly concerned with improvements in an apparatus for and a method of providing imprint and delivery of label-receipt type tape members on which are printed the results of multiple operations of a computing scale.

Computing scales have been accepted in many merchandising operations. In retail establishments, for example, they have been found advantageous because they effect savings in the time and labor required in handling merchandise for customers. Recent electronic digital point of sale counter scales, particularly, have been adopted where fast accurate weighing and pricing is desirable. Generally, such scales have been limited to the separate weighing and pricing of each commodity item, even where more than one item is to be weighed and priced for a single customer. To obtain a sum total price for any series of items for a single customer, the operator of the scales heretofore provided has been obliged to manually add the separate prices for each of the items. Some accessories have been developed to facilitate the use of such scales including printers which will provide a printed tape section in the form of a label or a customer receipt showing computer results. One such accessory has been developed which comprises a label-receipt printer which is adapted to be combined with a computer scale so as to provide a label having the results of a single weighing and computing operation printed thereon. Where such printers have been provided a laminate tape has been employed wherein the label stock is pre-diecut at uniform intervals to enable ready separation and to provide successive labels of uniform size for attachment to each separate commodity item. With this type printer, to obtain or show the final transaction total for any series of items for a single customer the operator must manually add the cost of the individual items.

More recently, a digital scale has been developed which has greatly improved capabilities. It will compute and display the value of a succession of articles placed on the scale platform and also compute and display the total value of a group of items including fixed price items as well as items required to be weighed and the price computed. Such a scale is disclosed in the application of Edward C. Karp and Colin E. Foster, Ser. No. 610,170, filed Sept. 4, 1975.

The printers which have been developed for use with prior computer scale arrangements and which have been adapted for printing the weight, unit price and total price of a single item, if employed with the more recent developed scale, would negate the improved capabilities of the same. While some of the printers which have been developed, heretofore, have been designed to provide labels formed or printed on tape material with pressure sensitive adhesive coating material and affixed to a backing strip, the tape has been precut into uniform length sections which has required providing positive label indexing means as part of the printer and such printers do not fill the recognized need for an apparatus which will provide quickly and accurately a more complete print-out record, such as, individual item information and total value or cost of a series of items on a single tape section. While the improved computer scale which has been developed makes available the more complete information desired on the scale label or receipt this has not fully satisfied the needs of the prospective users since a printer has not been designed and made available which is capable of accepting the more complete scale information and providing the desired printed label or receipt in a satisfactory manner. It is a general object, therefore, to provide an improved label printing mechanism for use with a digital scale of the improved type which will enable the user to quickly provide not only a single print-out label or tape section for individual items but which will also provide a single label with information on a variable number of items, including, the total value or price when it is desired to weigh and price more than a single item at a point of sale counter or similar location.

A more specific object of the invention is to provide an apparatus and a method of weighing on a computer scale which includes an improved means for recording on a tape section printed information on a plurality of items which are individually weighed on the scale and also including as part of the printed information the total price or value of the items which it is desired to treat as a group so as to eliminate the need for any manual computations and to obtain a single tape section having printed thereon such information together with a final value for the group of items and in addition other information made available through the scale operations and/or the printing head.

A further object of the invention is to provide a computer scale and an improved printer arrangement especially useful at a point of sale counter wherein the scale, preferably, an electronic digital type scale apparatus, will weigh and compute the cost, on a cost per unit of weight basis, of successive individual items and on command compute the total cost of a number of successive items, and wherein the printer will print on a continuous tape the scale information including the cost for each individual item and the total cost of a group of items with provisions for tearing off variable lengths of the tape so as to provide a label-receipt, of a length determined by the information made available by operation of the scale or the printer, and, if desired, including other additional information, such as, store identification, or the like.

To this end there is disclosed and claimed herein a weighing and printing arrangement wherein an improved label printing mechanism is provided for cooperation with a digital scale having the capability of weighing and computing, from a unit price, the cost of individual items positioned on the scale or a series of such items and to supply, through connecting circuitry, information, such as, weight, price per unit and total price of each item and also a group of items, which mechanism includes a printing head, responsive to scale supplied information, for printing in successive cross lines on a continuous tape and having means enabling the printed tape to be fed to a tear off member in an amount according to the printing thereon or the operator's judgment, so as to provide labels in the form of variable length tape sections having complete information on any desired series of items.

A clear understanding of the invention may be had by consideration of the hereinafter described apparatus and procedures which constitute the preferred embodiment of the invention and which are illustrated in the accompanying drawings wherein:

FIG. 1 is a block diagram illustrating a computer scale and printer arrangement with an interface circuit for controlling the operation of the printer;

FIG. 2 is a schematic elevational view of a label printer adapted for use with the computer scale mechanism; and FIG. 3 is a view showing a typical label receipt produced by the printer.

Referring to the drawings, there is illustrated, largely schematically, a computer weighing scale and an associated printing apparatus which is designed so that it may be electrically connected to the scale computer mechanism through a suitable circuit interface and respond to the operation of the computer mechanism. The printing apparatus is of a type which will enable the printing of the information derived from the operation of the computer mechanism in response to the scale operations, the latter being under the control of an operator.

The scale, which is indicated at 10, is a computer type with digital display mechanism. It has improved capabilities enabling the weighing of individual items, computation of the price of each item based on a price per unit of weight, storage of information on each successive item, and, upon demand by the operator, computation of the total price of a plurality of successively weighed or priced items. An improved scale with an associated computer mechanism having these capabilities is described in the aforementioned application Ser. No. 610,170 to which resort may be had for a fully description of the weighing and computing apparatus and method of operation, and which is incorporated herein for the purpose of illustrating the present invention.

A suitable interface circuit, indicated at 12 in FIG. 1, electrically connects the scale computer mechanism with the printing apparatus 14. In Ser. No. 610,170 there is described and illustrated an interface circuit which is adapted to serve such purposes with a slight modification thereinafter referred to.

The printer 14 may be basically one of several type presently available which may be electrically connected through the interface circuitry 12 with the computer mechanism of the conveyor 10 and, with some modification, adapted to operate in the desired manner to print the information which is supplied by the computer mechanism on a continuous tape. One such printer is available from Practical Automation, Inc., Trap Falls Rd., Shelton, Conn. 06484, and is identified as Series DMTP-6, MINIATURE ALPHANUMERIC DATA PRINTER. It is a dot-matrix serial impact printer and includes a needle type print head 16 (FIG. 2) which is controllable to print into a dot matrix at relatively high speed. A tape stock 18 is fed from a supply roll 20 in a path between the print head 16 and a co-operating inked ribbon 22. It has an indexing mechanism (not shown) which advances the continuous tape stock 18 so as to receive cross line printing thereon through controlled operation of the print head 16. The tape 18, which is illustrated, is a type which comprises a label material 24, generally paper, which is capable of receiving printing on a face thereof and which is coated on the non-printing face with a pressure sensitive adhesive over which a strippable protective cover web 26 is placed in a well known manner. The tape feed and tensioning mechanism is designed to advance the web 26 and hold it sufficiently taut to receive the printing and to insure delamination of the label stock at the breaker bar 32. In adapting the printer 14 to the present operation the indexing arrangement controls the advance of the tape to the printing head in relation to the printing operation of the head so as to print in successive cross lines, as shown at 28 in FIG. 3, the information supplied by the computer mechanism. This may comprise, for example, the weight, unit price and cost of several items, the total number of items and the total cost of the several items. Because it is Alphanumeric, the printer may be supplied with a means to print other information such as the name of the store, or the like, as indicated at 30. Upon completion of the printing for an item or a group of items the printed portion of the tape is indexed ahead in a path between a label separating rod or bar 32 and a tear-off bar 34 where the cover web 26 is stripped and fed by means of indexing and tensioning rollers 42 to a take up roll 36. The position of the rollers 42 relative to the web separating or stripper bar 32 and the drive for the take up roll will result in tension in the cover web across the separating bar 32 and separation of the cover web at an obtuse angle to the laminate tape thereby freeing the printed portion of the tape. The tear-off bar 34 has a knife edge which may be serrated, enabling the operator to tear off the desired section of the tape. In the printer configuration shown, the circuit interface 12 connecting the computer circuit with the control circuit (not shown) for the printer will provide for the preprint of such constant, predetermined data as may be common to all labels (such as store logo, address, columnar identifications, special messages, or other), thus usefully advancing the tape automatically by that amount required to provide a tear off tape section having the complete information on it relating to any given customer transaction or series of transactions.

I claim:

1. In an apparatus for weighing, computing the cost value and printing a label which includes a computer tape weighing scale having means for weighing an article and an associated electronic computer means for computing the value of the article according to a unit value per unit of weight and operable, upon demand, to add the value of a number of successive article values when a plurality of articles are weighed on the scale and the value of each of said articles computed and an electrical means for connecting the computer to a printed record producing mechanism, the combination of a tape printing apparatus connected by said electrical connecting means to said scale computer means which printing apparatus comprises a printing head responsive to operations of said scale computer means and operable for printing in successive transverse lines on a tape information supplied by the computer, and a tape supply means including a means for feeding a continuous tape to the printing head in predetermined timed relation to the operation of the printing head, means for indexing the printed tape in variable lengths according to the lines of printing thereon to position the printed portion of the tape at a tear off station adjacent the printing head, and means at said tear off station enabling printed portions of variable length to be separated from the tape.

2. In an apparatus having means for weighing articles, for electronically computing values of the articles according to unit values, and for printing information resulting from computer operations, the combination of a printing means having an electrically operated printing head, a means for supplying a continuous tape in position to receive printing upon operation of the printing head, means electrically connecting the printing head to the computing means which will operate the printing head so as to print multiple lines of information on the tape in response to computer operation, means for indexing the tape in response to operation of the printing head and, upon operator demand, means for indexing the printed tape according to the amount of printing on the tape so as to position the printed position of the tape at a tear off station beyond the printing head where the leading portion of the printed tape which has an accumulation of lines of printing thereon is free to be grasped by the operator and a means at said tear off station enabling the leading tape portion to be torn off.

3. In an apparatus as set forth in claim 2, wherein said means enabling the leading tape portion to be torn off comprises a tear bar disposed across the path of the tape.

4. In an apparatus as set forth in claim 2, wherein said tape supply means includes a continuous tape having a pressure sensitive adhesive coating on the non-printing face with a protective cover web and said printing means includes a cover web stripping means disposed at said tear off station beyond said printing head with a means to tension said cover web and to rewind said cover web.

5. In an apparatus as set forth in claim 4, wherein said means enabling said leading tape portion to be torn off comprises a tear bar disposed across the path of the tape and said web stripping means comprises a cross bar disposed adjacent said tear off bar across which the cover web is drawn at an angle to the path of the tape, and said bars are disposed on opposite sides of the path of said printed tape.

6. A printer for use in combination with a computer scale and for printing on a section of tape of the type which is characterized by having a face adapted to receive the printing and on the opposite face a pressure sensitive adhesive coating with a cover web, said printer having a tape supply means and a means for indexing the tape to feed said tape to a printing station, an electrically controlled printing head at said printing station which is adapted to be electrically connected to the computer mechanism of a computer scale and which is operative to print on said tape in response to computer operations, said printer having a cross bar disposed beyond said printing station and web tensioning and rewind members which serve as a stripper means for removing said adhesive cover web from said tape, and a knife-like tear bar opposite said stripper bar which enables the operator to tear off variable lengths of said printed tape according to the amount of printing on the tape.

7. A line printer for producing tickets of a variable number of lines comprising a supply of continuous laminate tape including a ticket sheet and a carrier web, a print head selectively operative to print information by lines on the ticket sheet of said laminate tape, means selectively operable for indexing said laminate tape and print head relative to one another for printing on a line-by-line basis, a cutter bar for said ticket sheet, a stripper bar for said carrier web, said cutter bar and said stripper bar being oppositely disposed on the ticket sheet side and on the carrier web side, respectively, of said printed on laminate tape and in close proximity to said printer head, means for applying tension to the carrier web across said stripper bar and at an angle obtuse to said laminate tape, thereby to strip said carrier web from said printed-on ticket sheet whereby the printed-on ticket sheet is presented to said tear bar for separation from said laminate tape.

* * * * *